(12) United States Patent
Kim et al.

(10) Patent No.: US 11,282,458 B2
(45) Date of Patent: Mar. 22, 2022

(54) SYSTEMS AND METHODS FOR TEMPERATURE-BASED PARASITIC CAPACITANCE VARIATION COMPENSATION

(71) Applicant: Apple Inc., Cupertino, CA (US)

(72) Inventors: Hyunsoo Kim, Mountain View, CA (US); Injae Hwang, Cupertino, CA (US); Jesun Kim, Cupertino, CA (US); Jesse A. Richmond, San Francisco, CA (US); Junhua Tan, Saratoga, CA (US); Jie Won Ryu, Santa Clara, CA (US); Hyunwoo Nho, Palo Alto, CA (US); Kingsuk Brahma, Mountain View, CA (US); Chaohao Wang, Sunnyvale, CA (US); Shiping Shen, Cupertino, CA (US); Myungjoon Choi, Sunnyvale, CA (US); Myung-Je Cho, San Jose, CA (US); Rebecca Park, Menlo Park, CA (US); Sun-Il Chang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/897,206

(22) Filed: Jun. 9, 2020

(65) Prior Publication Data

US 2020/0388225 A1 Dec. 10, 2020

Related U.S. Application Data

(60) Provisional application No. 62/859,613, filed on Jun. 10, 2019.

(51) Int. Cl.
*G09G 3/32* (2016.01)
*G09G 3/3258* (2016.01)
(Continued)

(52) U.S. Cl.
CPC .......... *G09G 3/3258* (2013.01); *G06F 3/044* (2013.01); *G09G 3/3655* (2013.01); *G09G 2320/0223* (2013.01); *G09G 2320/041* (2013.01)

(58) Field of Classification Search
CPC ........ G06F 3/0418; G06F 3/044; G06F 3/041; G09G 2300/0852; G09G 2300/0861;
(Continued)

(56) References Cited

U.S. PATENT DOCUMENTS 8,194,063 B2 6/2012 Levey et al.
9,396,694 B2 7/2016 Ahn et al.
(Continued)

FOREIGN PATENT DOCUMENTS

WO 2018212843 A1 11/2018

*Primary Examiner* — Hong Zhou
(74) *Attorney, Agent, or Firm* — Fletcher Yoder, P.C.

(57) ABSTRACT

Systems and methods are presently disclosed that compensate for temperature-based parasitic capacitance variation of a pixel of a display by causing a driver transistor of the pixel to enter an ohmic or linear region. A lookup table is generated based on temperatures at the pixel, diode voltages, and target diode currents or luminances at a diode of the pixel. A correction voltage is determined based on a target diode current or luminance, a temperature at the pixel, and the lookup table. A data voltage is applied corresponding to the target diode current or luminance and the correction voltage to the driver transistor.

20 Claims, 12 Drawing Sheets

(51) Int. Cl.
*G09G 3/36* (2006.01)
*G06F 3/044* (2006.01)

(58) Field of Classification Search
CPC ..... G09G 2320/0223; G09G 2320/041; G09G 3/3233; G09G 3/3258; G09G 3/3655; G09G 2300/0819
See application file for complete search history.

(56) References Cited

U.S. PATENT DOCUMENTS

| | | |
|---|---|---|
| 10,380,944 B2 | 8/2019 | Soni et al. |
| 10,497,300 B2 | 12/2019 | Xu et al. |
| 2010/0225630 A1* | 9/2010 | Levey .................. G09G 3/3233 345/211 |
| 2016/0155384 A1* | 6/2016 | Kim .................... G09G 3/2025 345/212 |
| 2017/0270855 A1* | 9/2017 | Maeda ................ G09G 3/3233 |
| 2017/0330518 A1* | 11/2017 | Lee ..................... G09G 3/2003 |
| 2018/0075798 A1* | 3/2018 | Nho .................... G09G 3/32 |

* cited by examiner

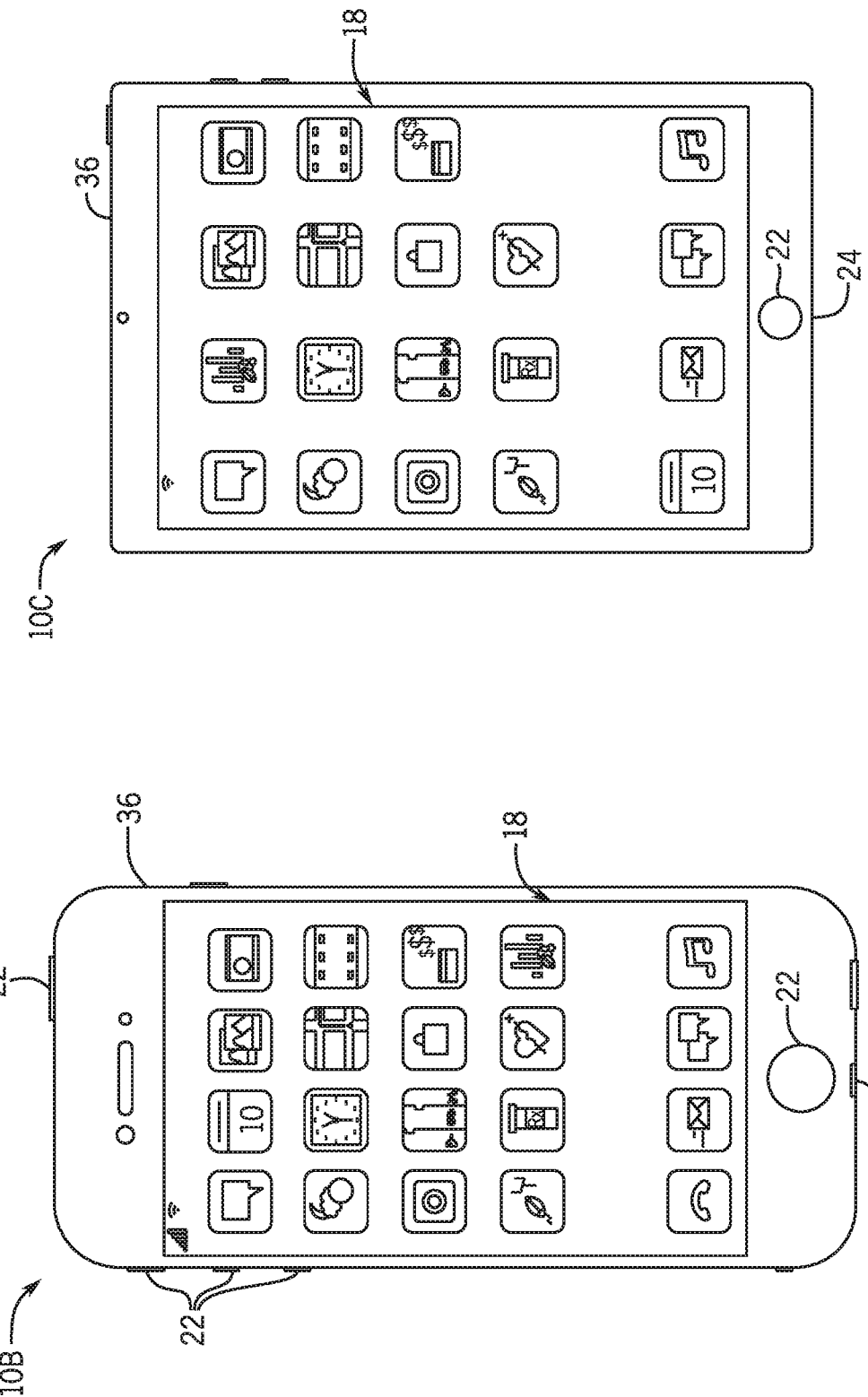

SYSTEMS AND METHODS FOR TEMPERATURE-BASED PARASITIC CAPACITANCE VARIATION COMPENSATION

CROSS REFERENCE TO RELATED APPLICATIONS

This application claims priority from and the benefit of U.S. Provisional Application Ser. No. 62/859,613, entitled "Systems and Methods for Temperature-Based Parasitic Capacitance Variation Compensation," filed Jun. 10, 2019, which is hereby incorporated by reference in its entirety for all purposes.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure relates to devices and methods for improving performance of certain electronic display devices including, for example, light emitting diode (LED) displays, such as organic light emitting diode (OLED) displays, active matrix organic light emitting diode (AMOLED) displays, or micro LED (µLED) displays. Under certain conditions, non-uniformity of a display induced by process, non-uniformity temperature gradients, or other factors across the display may be compensated for to increase performance of a display (e.g., reduce visible anomalies). The non-uniformity of pixels in a display may vary between devices of the same type (e.g., two similar phones, tablets, wearable devices, or the like), vary over time and usage (e.g., due to aging and/or degradation of the pixels or other components of the display), and/or vary with respect to temperatures, as well as in response to additional factors.

To improve display panel uniformity, compensation techniques related to adaptive correction of the display may be employed. For example, as pixel response (e.g., luminance and/or color) can vary due to component processing, temperature, usage, aging, and the like, in one embodiment, to compensate for non-uniform pixel response, a property of the pixel (e.g., a current or a voltage) may be measured (e.g., sensed via a sensing operation) and compared to a target value that is, for example, stored in a lookup table or the like, to generate a correction value to be applied to correct pixel illuminations to match a desired gray level. In this manner, modified data values may be transmitted to the display to generate compensated image data (e.g., image data that accurately reflects the intended image to be displayed by adjusting for non-uniform pixel responses).

Various refinements of the features noted above may be made in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIG. 3 is a front view of a hand-held device representing another embodiment of the electronic device of FIG. 1;

FIG. 4 is a front view of another hand-held device representing another embodiment of the electronic device of FIG. 1;

DETAILED DESCRIPTION OF SPECIFIC EMBODIMENTS

Figure 1:
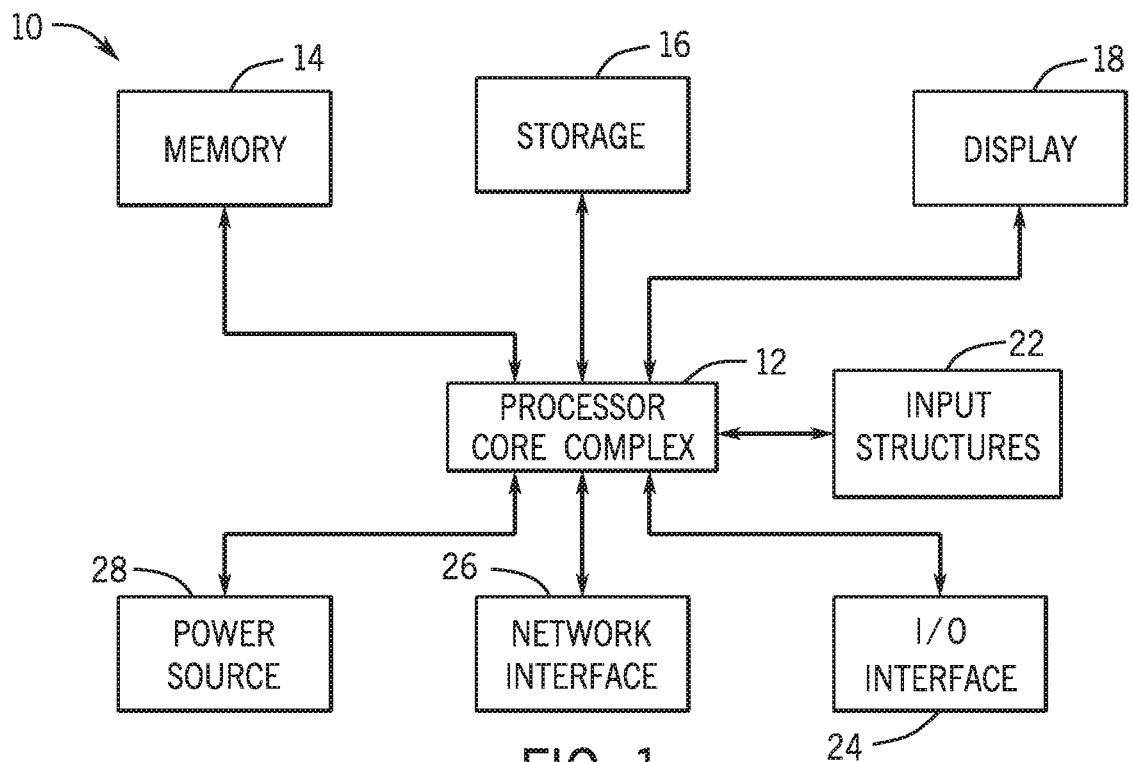
FIG. 1 is a schematic block diagram of an electronic device that performs display sensing and compensation, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

Electronic displays are ubiquitous in modern electronic devices. As electronic displays gain ever-higher resolutions and dynamic range capabilities, image quality has increasingly grown in value. In general, electronic displays contain numerous picture elements, or "pixels," that are programmed with image data. Each pixel emits a particular amount of light based on the image data. By programming different pixels with different image data, graphical content including images, videos, and text can be displayed.

Display panel sensing allows for operational properties of pixels of an electronic display to be identified to improve the performance of the electronic display. For example, variations in temperature and pixel aging (among other things) across the electronic display cause pixels in different locations on the display to behave differently. Indeed, the same image data programmed on different pixels of the display could appear to be different due to the variations in temperature and pixel aging. Without appropriate compensation, these variations could produce undesirable visual artifacts. However, compensation of these variations may hinge on proper sensing of differences in the images displayed on the pixels of the display. Accordingly, the techniques and systems described below may be utilized to enhance the compensation of operational variations across the display.

Figure 2:
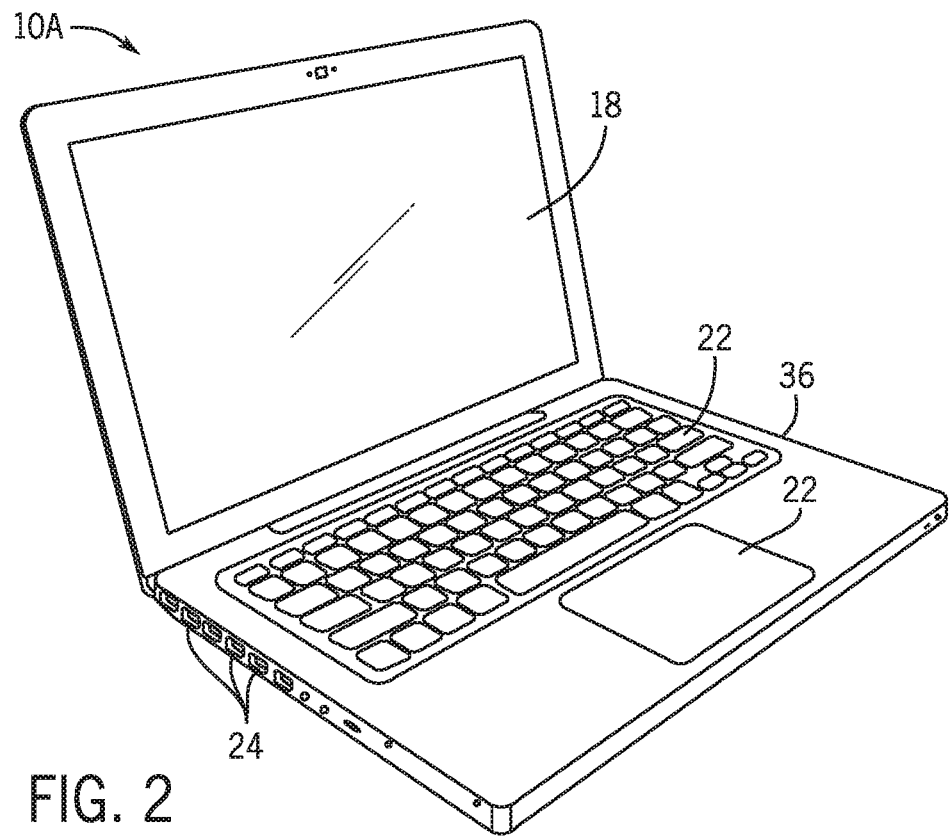
FIG. 2 is a perspective view of a notebook computer representing an embodiment of the electronic device of FIG. 1.
Figure 5:
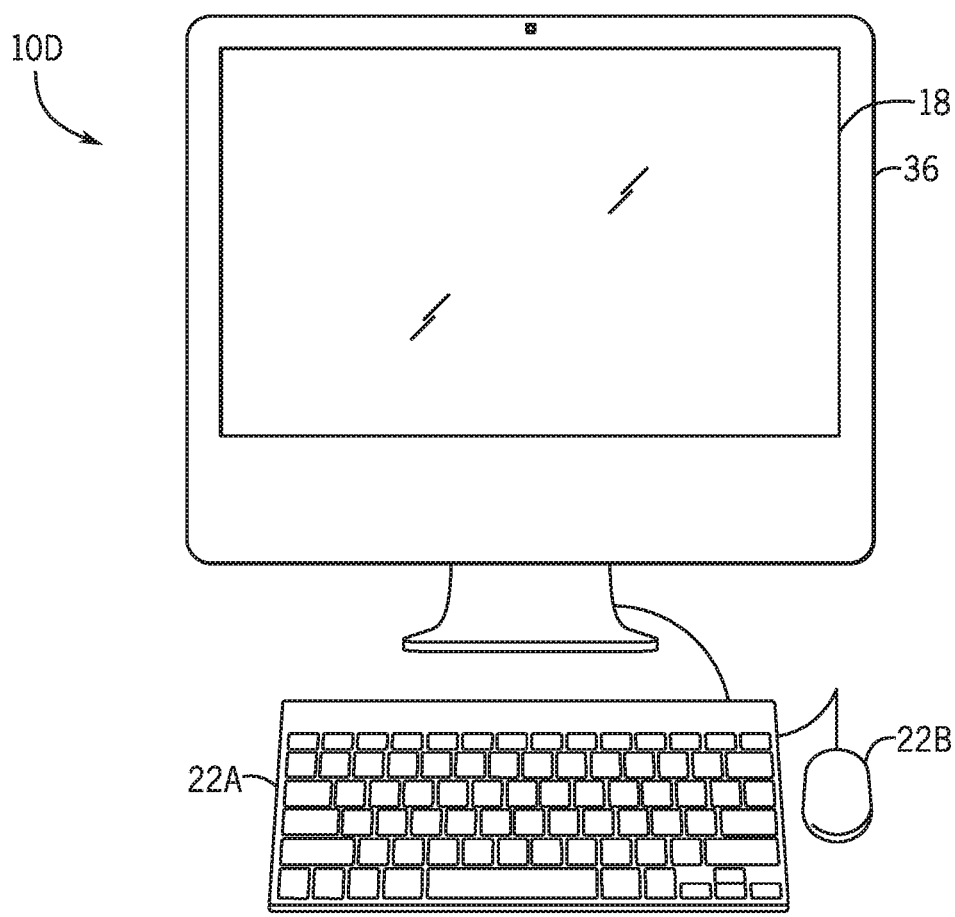
FIG. 5 is a front view of a desktop computer representing another embodiment of the electronic device of FIG. 1.
Figure 6:
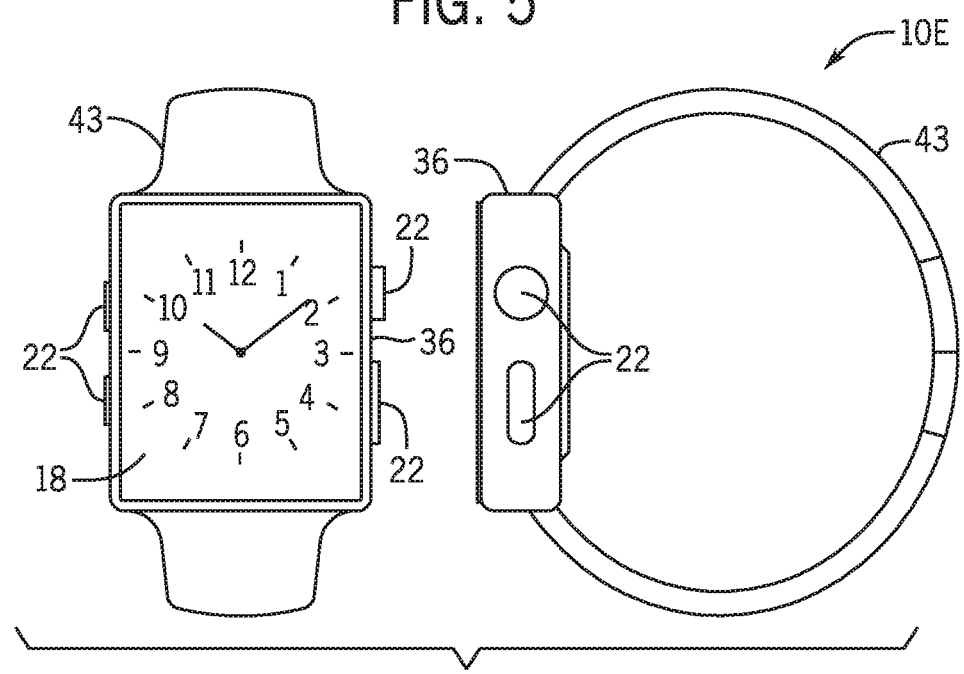
FIG. 6 is a front view and side view of a wearable electronic device representing another embodiment of the electronic device of FIG. 1.

With this in mind, a block diagram of an electronic device 10 is shown in FIG. 1. As will be described in more detail below, the electronic device 10 may represent any suitable electronic device, such as a computer, a mobile phone, a portable media device, a tablet, a television, a virtual-reality headset, a vehicle dashboard, or the like. The electronic device 10 may represent, for example, a notebook computer 10A as depicted in FIG. 2, a handheld device 10B as depicted in FIG. 3, a handheld device 10C as depicted in FIG. 4, a desktop computer 10D as depicted in FIG. 5, a wearable electronic device 10E as depicted in FIG. 6, or a similar device.

The electronic device 10 shown in FIG. 1 may include, for example, a processor core complex 12, a local memory 14, a main memory storage device 16, an electronic display 18, input structures 22, an input/output (I/O) interface 24, network interfaces 26, and a power source 28. The various functional blocks shown in FIG. 1 may include hardware elements (including circuitry), software elements (including machine-executable instructions stored on a tangible, non-transitory medium, such as the local memory 14 or the main memory storage device 16) or a combination of both hardware and software elements. It should be noted that FIG. 1 is merely one example of a particular implementation and is intended to illustrate the types of components that may be present in electronic device 10. Indeed, the various depicted components may be combined into fewer components or separated into additional components. For example, the local memory 14 and the main memory storage device 16 may be included in a single component.

The processor core complex 12 may carry out a variety of operations of the electronic device 10, such as causing the electronic display 18 to perform display panel sensing and using the feedback to adjust image data for display on the electronic display 18. The processor core complex 12 may include any suitable data processing circuitry to perform these operations, such as one or more microprocessors, one or more application specific processors (ASICs), or one or more programmable logic devices (PLDs). In some cases, the processor core complex 12 may execute programs or instructions (e.g., an operating system or application program) stored on a suitable article of manufacture, such as the local memory 14 and/or the main memory storage device 16. In addition to instructions for the processor core complex 12, the local memory 14 and/or the main memory storage device 16 may also store data to be processed by the processor core complex 12. By way of example, the local memory 14 may include random access memory (RAM) and the main memory storage device 16 may include read only memory (ROM), rewritable non-volatile memory such as flash memory, hard drives, optical discs, or the like.

The electronic display 18 may display image frames, such as a graphical user interface (GUI) for an operating system or an application interface, still images, or video content. The processor core complex 12 may supply at least some of the image frames. The electronic display 18 may be a self-emissive display, such as an organic light emitting diodes (OLED) display, a micro-LED display, a micro-OLED type display, or a liquid crystal display (LCD) illuminated by a backlight. In some embodiments, the electronic display 18 may include a touch screen, which may allow users to interact with a user interface of the electronic device 10. The electronic display 18 may employ display panel sensing to identify operational variations of the electronic display 18. This may allow the processor core complex 12 to adjust image data that is sent to the electronic display 18 to compensate for these variations, thereby improving the quality of the image frames appearing on the electronic display 18.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interface 26. The network interface 26 may include, for example, interfaces for a personal area network (PAN), such as a Bluetooth network, for a local area network (LAN) or wireless local area network (WLAN), such as an 802.11x Wi-Fi network, and/or for a wide area network (WAN), such as a cellular network. The network interface 26 may also include interfaces for, for example, broadband fixed wireless access networks (WiMAX), mobile broadband Wireless networks (mobile WiMAX), asynchronous digital subscriber lines (e.g., ADSL, VDSL), digital video broadcasting-terrestrial (DVB-T) and its extension DVB Handheld (DVB-H), ultra wideband (UWB), alternating current (AC) power lines, and so forth. The power source 28 may include any suitable source of power, such as a rechargeable lithium polymer (Li-poly) battery and/or an alternating current (AC) power converter.

In certain embodiments, the electronic device 10 may take the form of a computer, a portable electronic device, a wearable electronic device, or other type of electronic device. Such computers may include computers that are generally portable (such as laptop, notebook, and tablet computers) as well as computers that are generally used in one place (such as conventional desktop computers, workstations and/or servers). In certain embodiments, the electronic device 10 in the form of a computer may be a model of a MacBook®, MacBook® Pro, MacBook Air®, iMac®, Mac® mini, or Mac Pro® available from Apple Inc. By way of example, the electronic device 10, taking the form of a notebook computer 10A, is illustrated in FIG. 2 in accordance with one embodiment of the present disclosure. The depicted computer 10A may include a housing or enclosure 36, an electronic display 18, input structures 22, and ports of an I/O interface 24. In one embodiment, the input structures 22 (such as a keyboard and/or touchpad) may be used to interact with the computer 10A, such as to start, control, or operate a GUI or applications running on computer 10A. For example, a keyboard and/or touchpad may allow a user to navigate a user interface or application interface displayed on the electronic display 18.

FIG. 3 depicts a front view of a handheld device 10B, which represents one embodiment of the electronic device 10. The handheld device 10B may represent, for example, a portable phone, a media player, a personal data organizer, a handheld game platform, or any combination of such devices. By way of example, the handheld device 10B may be a model of an iPod® or iPhone® available from Apple Inc. of Cupertino, Calif. The handheld device 10B may include an enclosure 36 to protect interior components from physical damage and to shield them from electromagnetic interference. The enclosure 36 may surround the electronic display 18. The I/O interfaces 24 may open through the enclosure 36 and may include, for example, an I/O port for a hard wired connection for charging and/or content manipulation using a standard connector and protocol, such as the Lightning connector provided by Apple Inc., a universal serial bus (USB), or other similar connector and protocol.

User input structures 22, in combination with the electronic display 18, may allow a user to control the handheld device 10B. For example, the input structures 22 may activate or deactivate the handheld device 10B, navigate user interface to a home screen, a user-configurable application screen, and/or activate a voice-recognition feature of the handheld device 10B. Other input structures 22 may provide volume control, or may toggle between vibrate and ring modes. The input structures 22 may also include a microphone may obtain a user's voice for various voice-related features, and a speaker may enable audio playback and/or certain phone capabilities. The input structures 22 may also include a headphone input may provide a connection to external speakers and/or headphones.

FIG. 4 depicts a front view of another handheld device 10C, which represents another embodiment of the electronic device 10. The handheld device 10C may represent, for example, a tablet computer or portable computing device. By way of example, the handheld device 10C may be a tablet-sized embodiment of the electronic device 10, which may be, for example, a model of an iPad® available from Apple Inc. of Cupertino, Calif.

Turning to FIG. 5, a computer 10D may represent another embodiment of the electronic device 10 of FIG. 1. The computer 10D may be any computer, such as a desktop computer, a server, or a notebook computer, but may also be a standalone media player or video gaming machine. By way of example, the computer 10D may be an iMac®, a MacBook®, or other similar device by Apple Inc. It should be noted that the computer 10D may also represent a personal computer (PC) by another manufacturer. A similar enclosure 36 may be provided to protect and enclose internal components of the computer 10D such as the electronic display 18. In certain embodiments, a user of the computer 10D may interact with the computer 10D using various peripheral input devices, such as input structures 22A or 22B (e.g., keyboard and mouse), which may connect to the computer 10D.

Similarly, FIG. 6 depicts a wearable electronic device 10E representing another embodiment of the electronic device 10 of FIG. 1 that may be configured to operate using the techniques described herein. By way of example, the wearable electronic device 10E, which may include a wristband 43, may be an Apple Watch® by Apple Inc. However, in other embodiments, the wearable electronic device 10E may include any wearable electronic device such as, for example, a wearable exercise monitoring device (e.g., pedometer, accelerometer, heart rate monitor), or other device by another manufacturer. The electronic display 18 of the wearable electronic device 10E may include a touch screen display 18 (e.g., LCD, OLED display, active-matrix organic light emitting diode (AMOLED) display, and so forth), as well as input structures 22, which may allow users to interact with a user interface of the wearable electronic device 10E.

Figure 7:
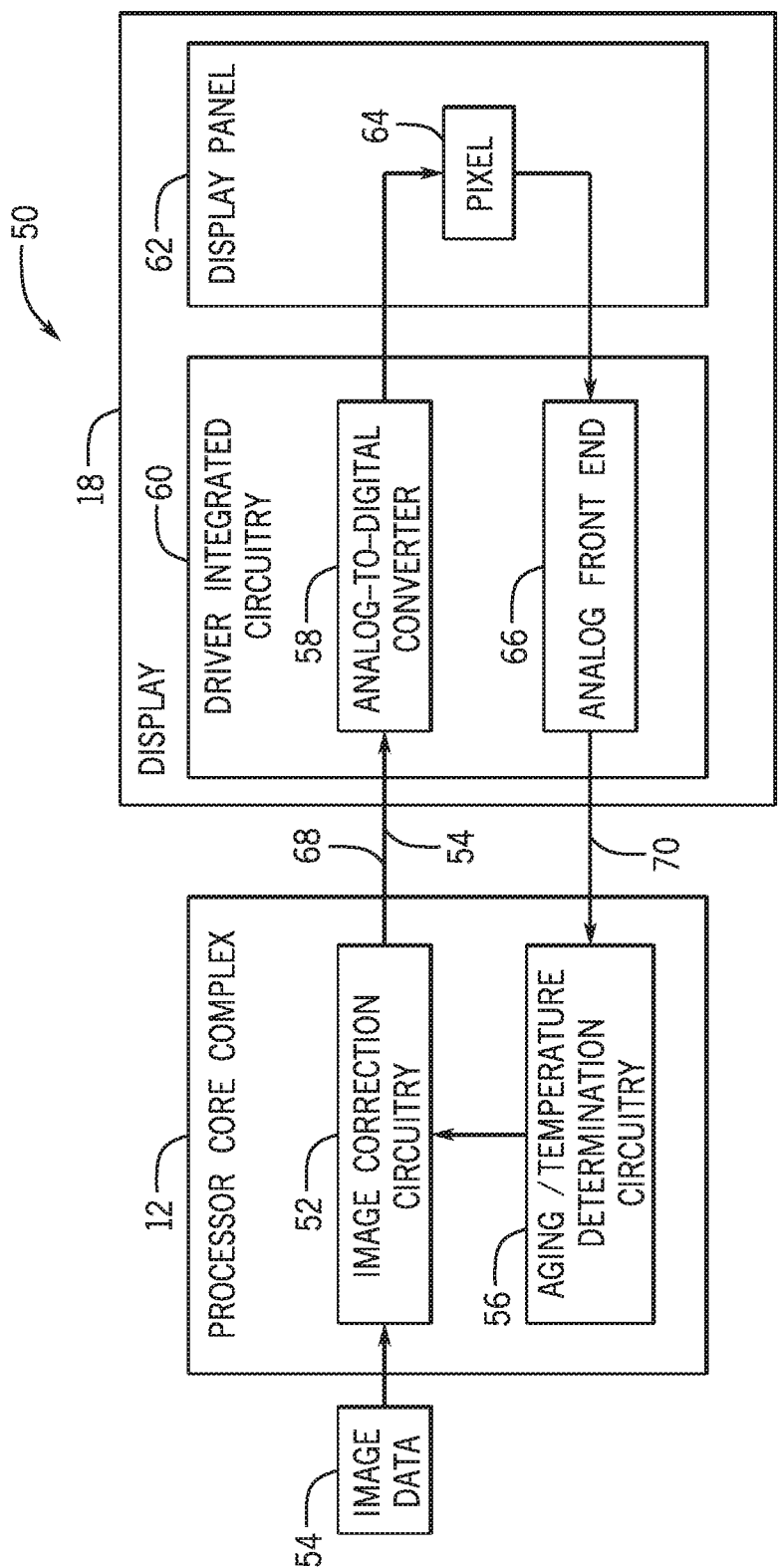
FIG. 7 is a block diagram of a system for display sensing and compensation of the electronic device of FIG. 1, according to an embodiment of the present disclosure.

FIG. 7 is a block diagram of a system 50 for display sensing and compensation of the electronic device 10 of FIG. 1, according to an embodiment of the present disclosure. The system 50 includes the processor core complex 12, which includes image correction circuitry 52. The image correction circuitry 52 may receive image data 54, and compensate for non-uniformity of the display 18 based on and induced by process non-uniformity temperature gradients, aging of the display 18, and/or other factors across the display 18 to increase performance of the display 18 (e.g., by reducing visible anomalies). The non-uniformity of pixels in the display 18 may vary between devices of the same type (e.g., two similar phones, tablets, wearable devices, or the like), over time and usage (e.g., due to aging and/or degradation of the pixels or other components of the display 18), and/or with respect to temperatures, as well as in response to additional factors.

As illustrated, the system 50 includes aging/temperature determination circuitry 56 that may determine or facilitate determining the non-uniformity of the pixels in the display 18 due to, for example, aging and/or degradation of the pixels or other components of the display 18. The aging/temperature determination circuitry 56 that may also determine or facilitate determining the non-uniformity of the pixels in the display 18 due to, for example, temperature. The variation in temperature may be due to changes in ambient temperature and/or a proximity of the pixels to a heat source (e.g., a fingertip of a user). In some cases, the pixels may be laying on top of or be in otherwise close proximity to other components of an electronic device that may be more densely packed with components due to the relatively small size of the electronic device (e.g., handheld, mobile, or portable electronic devices such as 10B, 10C, 10E). As such, the variation in temperature may be due to operation of the components that the pixels are laying on top of or are in close proximity to.

The image correction circuitry 52 may send the image data 54 (for which the non-uniformity of the pixels in the display 18 have or have not been compensated for by the image correction circuitry 52) to analog-to-digital converter 58 of a driver-integrated circuit 60 of the display 18. The analog-to-digital conversion converter 58 may digitize the image data 54 when it is in an analog format. The driver-integrated circuit 60 may send signals across gate lines to cause a row of pixels of a display panel 62, including pixel 64, to become activated and programmable, at which point the driver-integrated circuit 60 may transmit the image data 54 across data lines to program the pixels, including the pixel 64, to display a particular gray level (e.g., individual pixel brightness). By supplying different pixels of different colors with the image data 54 to display different gray levels, full-color images may be programmed into the pixels. The driver-integrated circuit 60 may also include a sensing analog front end (AFE) 66 to perform analog sensing of the response of the pixels to data input (e.g., the image data 54) to the pixels.

The processor core complex 12 may also send sense control signals 68 to cause the display 18 to perform display panel sensing. In response, the display 18 may send display sense feedback 70 that represents digital information relating to the operational variations of the display 18. The display sense feedback 70 may be input to the aging/temperature determination circuitry 56, and take any suitable form. Output of the aging/temperature determination circuitry 56 may take any suitable form and be converted by the image correction circuitry 52 into a compensation value that, when applied to the image data 54, appropriately compensates for non-uniformity of the display 18. This may result in greater fidelity of the image data 54, reducing or eliminating visual artifacts that would otherwise occur due to the operational variations of the display 18. In some embodiments, the processor core complex 12 may be part of the driver-integrated circuit 60, and as such, be part of the display 18.

Figure 8:
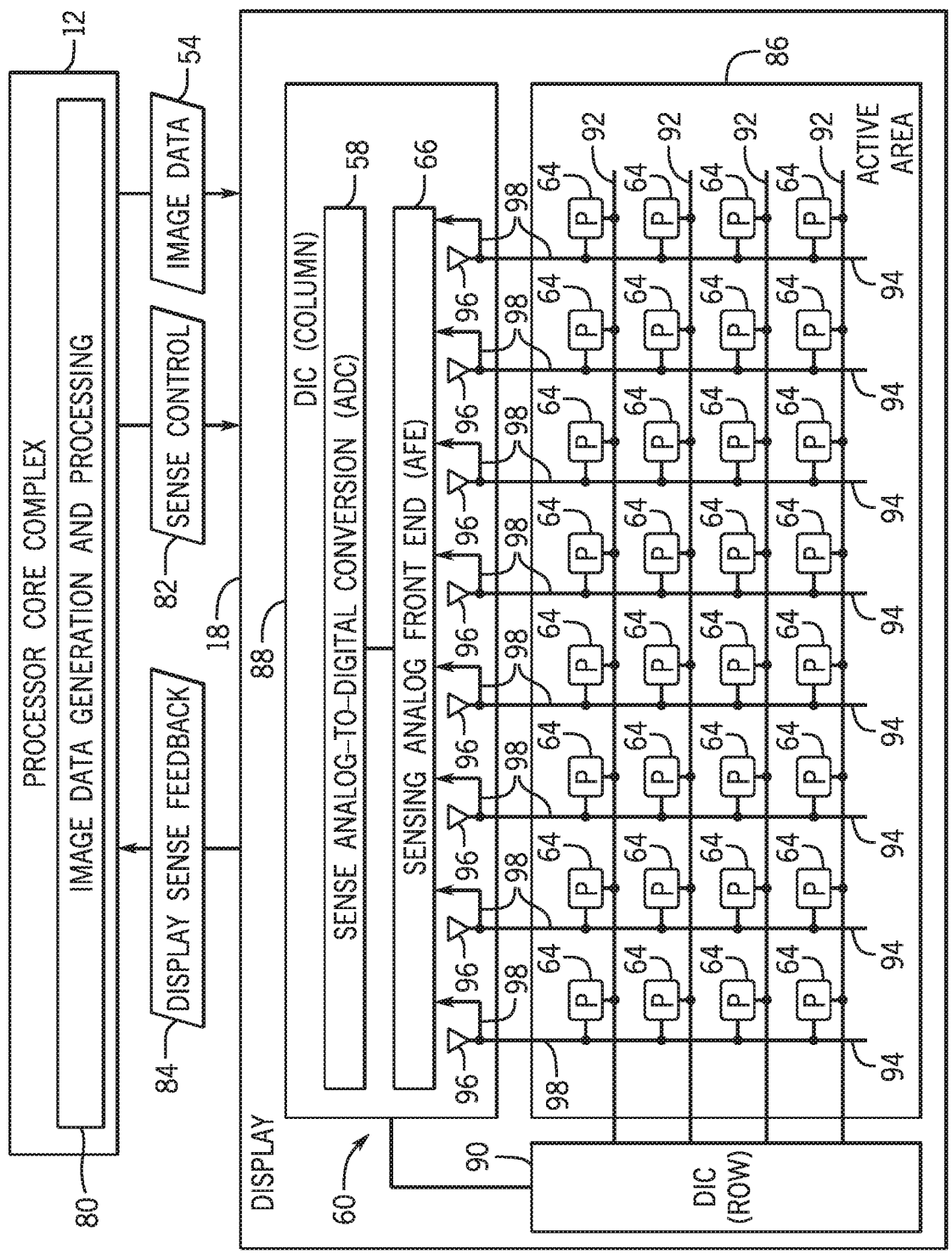
FIG. 8 is a schematic diagram of the system for display sensing and compensation of FIG. 7, according to an embodiment of the present disclosure.

FIG. 8 is a schematic diagram of the system 50 for display sensing and compensation of FIG. 7, according to an embodiment of the present disclosure. The processor core complex 12 may include image data generation and processing circuitry 80 to generate the image data 54 for display by the electronic display 18. The image data generation and processing circuitry 80 represents various circuitry and processing that may be employed by the processor core complex 12 to generate the image data 54 and control the electronic display 18. As such, the image data generation and processing circuitry 80 may include, for example, the image correction circuitry 52 and/or the aging/temperature determination circuitry 56 of FIG. 7. In some embodiments, the image data generation and processing circuitry 80 may include a graphics processing unit, a display pipeline, or the like, to facilitate control of operation of the electronic display 18. The image data generation and processing circuitry 80 may include a processor and memory such that the processor of the image data generation and processing circuitry 80 may execute instructions and/or process data stored in memory of the image data generation and processing circuitry 80 to control operation of the electronic display 18.

To compensate for operational variations of the electronic display 18 due to, for example, temperature variation or aging of the display 18, the processor core complex 12 may provide sense control signals 82 to cause the electronic display 18 to perform display panel sensing and generate display sense feedback 84. The display sense feedback 84 represents digital information relating to the operational variations of the electronic display 18. The display sense feedback 84 may take any suitable form, and may be converted by the image data generation and processing circuitry 80 into a compensation value that, when applied to the image data 54, appropriately compensates for the conditions of the electronic display 18 in the image data 54. This may result in greater fidelity of the image data 54, reducing or eliminating visual artifacts that would otherwise occur due to the operational variations of the electronic display 18.

The electronic display 18 includes an active area 86 with an array of pixels 64. The pixels 64 are schematically shown distributed substantially equally apart and of the same size, but in an actual implementation, pixels of different colors may have different spatial relationships to one another and may have different sizes. In one example, each pixel 64 may have a red-green-blue (RGB) format that includes red, green, and blue pixels or sub-pixels. In another example, the pixels 64 may take a red-green-blue-green (RGBG) format in a diamond pattern. The pixels 64 are controlled by the driver-integrated circuit 60, which may be a single module or may be made up of separate modules, such as a column or source driver-integrated circuit 88 and a row or gate driver-integrated circuit 90. The driver-integrated circuit 60 (e.g., the row driver-integrated circuit 90) may send signals across gate lines 92 (e.g., using gate drivers) to cause a row of pixels 64 to become activated and programmable, at which point the driver-integrated circuit 60 (e.g., the column driver-integrated circuit 88) may transmit image data signals across data lines 94 to program the pixels 64 to display a particular gray level (e.g., individual pixel brightness). By supplying different pixels 64 of different colors with image data 54 to display different gray levels, full-color images may be programmed into the pixels 64. The image data 54 may be driven to an active row of pixels 64 via source drivers 96, which may also be referred to as column drivers.

Regardless of the particular arrangement and layout of the pixels 64, each pixel 64 may be sensitive to changes on the active area 86 of the electronic display 18, such as variations and temperature of the active area 86, as well as the overall age of the pixel 64. Indeed, when each pixel 64 is a light emitting diode (LED), it may gradually emit less light over time. This effect is referred to as aging, and takes place over a slower time period than the effect of temperature on the pixel 64 of the electronic display 18.

As described above, the electronic display 18 may display image frames through control of the luminance of the pixels 64 based on the received image data 54. When a pixel 64 is activated (e.g., via a gate activation signal across a gate line 92 activating a row of pixels 64), luminance of a display pixel 64 may be adjusted by image data 54 received via a data line 94 coupled to the pixel 64. Thus, as depicted, each pixel 64 may be located at an intersection of a gate line 92 (e.g., which may act as, include, or be disposed alongside a scan line) and a data line 94 (e.g., a source line). Based on the received image data 54, the luminance of a display pixel 64 may be adjusted using electrical power supplied from a power source 28, for example, via power a supply lines coupled to the pixel 64.

In some embodiments, to facilitate displaying an image frame, a timing controller may determine and transmit timing data to a gate driver of the row driver-integrated circuit 90 based on the image data 54. For example, in the depicted embodiment, the timing controller may be included in the column driver-integrated circuit 88. The column driver-integrated circuit 88 may receive image data 54 that indicates desired luminance of one or more display pixels 64 for displaying an image frame of the image data 54, analyze the image data 54 to determine the timing data based on the display pixels 64 that the image data 54 corresponds to, and transmit the timing data to the gate driver of the row driver-integrated circuit 90. Based on the timing data, the gate driver may then transmit gate activation signals to activate a row of display pixels 64 via a gate line 92.

As illustrated, the image data generation and processing circuitry 80 may be externally coupled to the electronic display 18. For example, the image data generation and processing circuitry 80 may be included in the processor core complex 12, which is separate from but communicatively coupled to the electronic display 18 and the driver-integrated circuit 60 (including the column driver-integrated circuit 88 and the row driver-integrated circuit 90) of the electronic display 18. Additionally or alternatively, the image data generation and processing circuitry 80 may represent separate circuitry from the processor core complex 12. In some cases, the image data generation and processing circuitry 80 may be modular from the display 18 and conveniently updated and/or replaced (e.g., compared to if it were integrated in the display 18). In other cases, the image data generation and processing circuitry 80 may be a component of the electronic display 18 itself. Moreover, in cases where the system 50 is part of a component-dense electronic device 10 (such as the handheld devices 10B-C or the wearable electronic device 10E) that would place a display-integrated image data generation and processing circuitry in close proximity to (e.g., underlying) the pixels 64, heat generated from the image data generation and processing circuitry 80 may combine or intermix with the heat generated from the pixels 64, which may result in inaccurate temperature measurements of the pixels 64. However, in other embodiments, the image data generation and processing circuitry 80 may be part of the display 18.

Display panel sensing may be used to obtain the display sense feedback 84, which may enable the processor core complex 12 to generate compensated image data 54 to negate the effects of temperature, aging, and other variations of the active area 86. The driver-integrated circuit 60 (e.g., the column driver-integrated circuit 88) may include the sensing analog front end (AFE) 66 to perform analog sensing of the response of pixels 64 to test data (e.g., test image data) or user data (e.g., user image data). It should be understood that further references to test data or test image data in the present disclosure include test data and/or user data. The analog signal may be digitized by sensing analog-to-digital conversion circuitry (ADC) 58.

For example, to perform display panel sensing, the electronic display 18 may program one of the pixels 64 with test data (e.g., having a particular reference voltage or reference current). The sensing analog front end 66 then senses (e.g., measures, receives, etc.) at least one value (e.g., voltage, current, etc.) along sense line 98 connected to the pixel 64 that is being tested. Here, the data lines 94 are shown to act as extensions of the sense lines 98 of the electronic display 18. In other embodiments, however, the display active area 86 may include other dedicated sense lines 98 or other lines of the display 18 (e.g., such as the gate or scan lines 92) may be used as sense lines 98 instead of the data lines 94. In some embodiments, other pixels 64 that have not been programmed with test data may be also sensed at the same time a pixel 64 that has been programmed with test data is sensed. Indeed, by sensing a reference signal on a sense line 98 when a pixel 64 on that sense line 98 has not been programmed with test data, a common-mode noise reference value may be obtained. This reference signal can be removed from the signal from the test pixel 64 that has been programmed with test data to reduce or eliminate common mode noise.

The analog signal may be digitized by the sensing analog-to-digital conversion circuitry 58. The sensing analog front end 66 and the sensing analog-to-digital conversion circuitry 58 may operate, in effect, as a single unit. The driver-integrated circuit 60 (e.g., the column driver-integrated circuit 88) may also perform additional digital operations to generate the display sense feedback 84, such as digital filtering, adding, or subtracting, to generate the display sense feedback 84, or such processing may be performed by the processor core complex 12.

Figure 9:
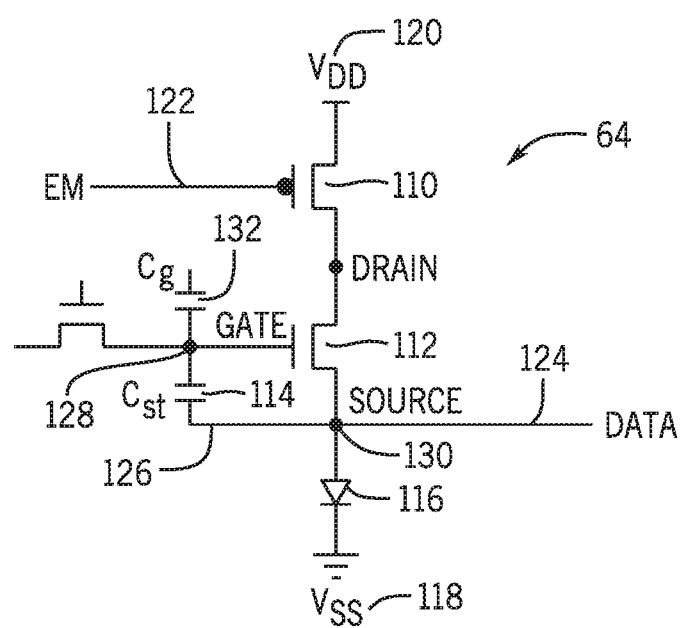
FIG. 9 is a circuit diagram of a display pixel of the electronic display of the electronic device of FIG. 1, according to embodiments of the present disclosure.

FIG. 9 is a circuit diagram of a display pixel 64 of the electronic display 18 of the electronic device 10 of FIG. 1, according to embodiments of the present disclosure. The circuit diagram of the display pixel 64 is intended to represent one example of pixel circuitry that may benefit from this disclosure, and is not intended to be exhaustive. Indeed, many other pixel circuits may benefit from the systems and methods of this disclosure. In the example of FIG. 9, the display pixel 64 may include a circuit-switching thin-film transistor (TFT) 110, a driver TFT 112, a storage capacitor 114, and a diode 116 (e.g., an OLED). The storage capacitor 114 and/or the diode 116 may be coupled to any suitable negative or ground power supply voltage, $V_{SS}$ 118. That is, the negative power supply voltage, $V_{SS}$ 118 (which may be provided by a voltage rail in the display panel 62 and supplied by the driver-integrated circuit 60), may provide between 0 and, for example, −100 Volts (V), such as a voltage of zero, −1 V, −2 V, −4 V, −6 V, or any other suitable negative or ground voltage. While $V_{SS}$ 118 is referred to as a negative or ground power supply voltage, it should be understood this is with respect to the positive power supply voltage $V_{DD}$ 120. As such, in some cases, $V_{SS}$ 118 may be positive, as long as it provides a voltage that is less than $V_{DD}$ 120. For example, if $V_{DD}$ 120 is 4 V, then $V_{SS}$ 118 may be 2 V. Moreover, variations may be utilized in place of the illustrated pixel 64. For example, FIG. 9 illustrates the circuit-switching TFT 110 as a p-channel metal-oxide-semiconductor (PMOS) TFT. However, in some embodiments, the circuit-switching TFT 110 may be an n-channel metal-oxide-semiconductor (NMOS) TFT. Similarly, FIG. 9 illustrates the driver TFT 112 as an NMOS TFT, though, in some embodiments, the driver TFT 112 may be a PMOS TFT.

To facilitate adjusting luminance and operating the diode 116, the switching TFT 110 and the driver TFT 112 may each serve as a switching device that may couple to or decouple from other circuits and be controllably turned on and off by voltage applied to their respective gates. In the depicted embodiment, the gate of the circuit-switching TFT 110 is electrically coupled to a gate line 122. Accordingly, when a gate activation signal (e.g., an emission voltage EM which may be provided by a voltage rail in the display panel 62 and supplied by the driver-integrated circuit 60) received from the gate line 122 is below a threshold voltage, the first circuit-switching TFT 110 may turn on, thereby activating the pixel 64 and charging the storage capacitor 114 with image data received at data line 124. When the gate activation signal received from the gate line 122 is above the threshold voltage, the circuit-switching TFT 110 may turn off, thereby deactivating the pixel 64 and ceasing charging of the storage capacitor 114 with the image data received at the data line 124. The signal received by the driver TFT 112 from the data line 124 may be referred to as a $V_{GS}$ signal 126, since it is received between the gate and the source of the driver TFT 112.

Additionally, in the depicted embodiment, the gate of the driver TFT 112 is electrically coupled to the storage capacitor 114. As such, voltage of the storage capacitor 114 may control operation of the driver TFT 112. More specifically, in some embodiments, the driver TFT 112 may be operated in an active or saturation region to control magnitude of supply current flowing through the diode 116, such as from a power supply providing positive supply voltage $V_{DD}$ 120. That is, the positive power supply voltage, $V_{DD}$ 120 (which may be provided by a voltage rail in the display panel 62 and supplied by the driver-integrated circuit 60), may provide between 0 and, for example, 100 V, such as a voltage of zero, 1 V, 2 V, 4 V, 6 V, or any other suitable positive voltage (relative to the negative or ground power supply voltage, $V_{SS}$ 118). In other words, as gate voltage $V_G$ 128 (e.g., storage capacitor 114 voltage) increases above a threshold voltage, the driver TFT 112 may increase the amount of its channel available to conduct electrical current, thereby increasing supply current flowing to the diode 116. On the other hand, as the gate voltage $V_G$ 128 decreases while still being above the threshold voltage, the driver TFT 112 may decrease the amount of its channel available to conduct electrical current, thereby decreasing supply current flowing to the diode 116. The luminance of the diode 116 is dependent on the amount of current flowing through the diode 116. In this manner, the luminance of the pixel 64 may be controlled and, when similar techniques are applied across the display 18 (e.g., to additional pixels 64 of the display 18), an image may be displayed.

However, temperature variation or gradients may alter the luminance or color emitted by the diode 116 due to effects on the driver TFT 112 and/or the diode 116. For example, when temperature increases at the pixel 64, more thermally activated charges may be generated in the diode 116 and, as a result, an applied voltage may result in higher current (compared to the current induced at the applied voltage at lower temperatures).

Moreover, in a source-follower pixel, the gate of the driver TFT 112 serves as an input, the source of the driver TFT 112 serves as an output, and the drain of the driver TFT 112 may serve as either an input or an output, such as the pixel 64 illustrated in FIG. 9. Boot-strapping (or pulling up an operating point of the driver TFT 112 above its power supply rail (e.g., supplying the positive power supply voltage, $V_{DD}$ 120)) of the gate voltage ($V_G$ 128) of the pixel 64 occurs through the storage capacitor 114 when anode or input voltage of the diode 116 (or source voltage $V_S$ 130 of the driver TFT 112) increases during emission to maintain a constant data voltage ($V_{GS}$ 126).

In some cases, a parasitic capacitance at the gate of the driver TFT 112 (illustrated as $C_G$ 132) may cause a loss of data voltage ($V_{GS}$ 126) during emission, as illustrated by the following equation:

$$\Delta V_G = \Delta V_S \times \frac{C_{ST}}{C_{ST} + C_G} \qquad \text{(Equation 1)}$$

$C_{ST}$ represents the storage capacitance (of the storage capacitor 114). As such, an increase in gate voltage ($\Delta V_G$ 128) at the driver TFT 112 may not be the same as an increase in anode voltage of the diode 116 or source voltage $V_S$ 130 of the driver TFT 112. Thus, the parasitic capacitance $C_G$ 132 at the gate of the driver TFT 112 may result in less effective boot-strapping by the storage capacitor 114, and possibly undesired luminance and/or color emitted by the diode 116.

In some embodiments, the pixel 64 may include subpixels (e.g., a red subpixel, a green subpixel, and a blue subpixel), each having a respective diode 116. To have the pixel 64 produce a light of desired luminance and color, the voltage applied to each diode 116 (e.g., the anode voltage of the diode 116 or source voltage $V_S$ 130 of the driver TFT 112) of each subpixel of the pixel 64 may be different. As such, compensation schemes based on sensing (e.g., current) at the driver TFT 112 may fail to compensate for or take into account the separate and possible different voltage losses due to respective parasitic capacitances $C_G$ 132 at diodes 116 of each subpixel of a pixel 64, resulting in undesired luminance and/or color produced by the pixel 64.

To compensate for operational variations, such as temperature, at a pixel 64, and particularly to compensate for the effect of the operational variations on parasitic capacitance on the diode 116 of the pixel 64, the presently disclosure systems and methods include generating a lookup table representing changes in diode voltage (e.g., $V_{Diode}$) that correspond to resulting diode currents or luminances at different temperatures. The diode voltage $V_{Diode}$ may refer to the anode voltage of the diode 116 or source voltage $V_S$ 130 of the driver TFT 112. The changes in diode voltages may be determined based on differences between a positive supply voltage $V_{DD}$ 120 and a negative supply voltage $V_{SS}$ 118. Because the differences may also include driver TFT voltages when the driver TFT 112 is in an active or saturation region, the driver-integrated circuit 60 may increase the negative supply voltage $V_{SS}$ 118 to place the driver TFT 112 in a linear region. This may cause the driver TFT 112 to operate as a resistor, and reduce or minimize the driver TFT voltages in comparison to the diode voltages.

Figure 10:
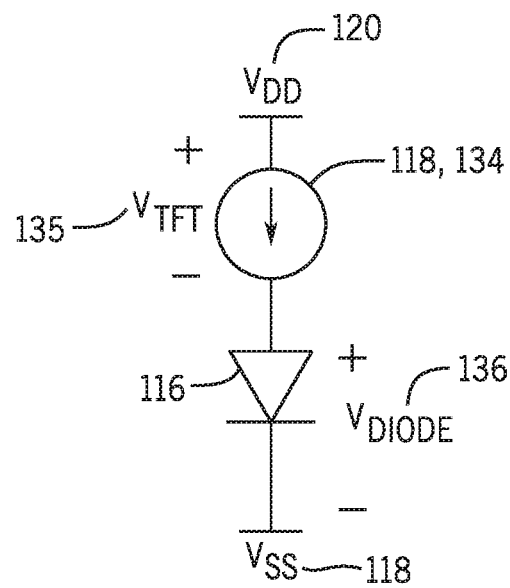
FIG. 10 is a circuit diagram of a portion of the pixel of FIG. 9 with a driver thin-film transistor (TFT) in an active or saturation region, according to embodiments of the present disclosure.

For example, FIG. 10 is a circuit diagram of a portion of the pixel 64 with the driver TFT 112 in the active or saturation region, according to embodiments of the present disclosure. In particular, the driver TFT 112 may operate in the active or saturation region to control the magnitude of supply current flowing through the diode 116, causing the diode 116 to emit light. The driver TFT 112 may operate in the active or saturation region when $V_{GS}$ 126 (e.g., the voltage between the gate and the source of the driver TFT 112, which may include the data voltage provided via the data line 124) is greater than $V_{th}$ (e.g., the threshold voltage of the driver TFT 112), and $V_{DS}$ (e.g., the voltage between the drain and the source of the driver TFT 112) is greater than or equal to a difference between $V_{GS}$ 126 and $V_{th}$, as illustrated in the following equations:

$$V_{GS} > V_{th} \qquad \text{(Equation 2)}$$

$$V_{DS} \geq V_{GS} - V_{th} \quad \text{(Equation 3)}$$

$V_{TH}$ may represent the minimum $V_{GS}$ 126 needed to create a conducting path between the source and drain of the driver TFT 112. Because, $V_{GS}$ 126 is greater than $V_{TH}$, the driver TFT 112 acts as a switch that is turned on or closed, and creates a channel that enables current to flow between drain and source. Since $V_D$ (e.g., the drain voltage) is higher than $V_S$ (e.g., the source voltage), the electrons spread out, and conduction is not through a narrow channel but through a broader, two- or three-dimensional current distribution extending away from the interface and deeper in the substrate of the driver TFT 112. As such, the driver TFT 112 may act as a current source 134, as illustrated in FIG. 10. As a result, the difference between the positive supply voltage $V_{DD}$ 120 and the negative supply voltage $V_{SS}$ 118 may be applied in significant portions to both the driver TFT 112 (e.g., $V_{TFT}$ 135) and the diode voltage (e.g., $V_{Diode}$ 136), and thus may not provide an accurate estimation of the diode voltage $V_{Diode}$ 136.

Figure 11:
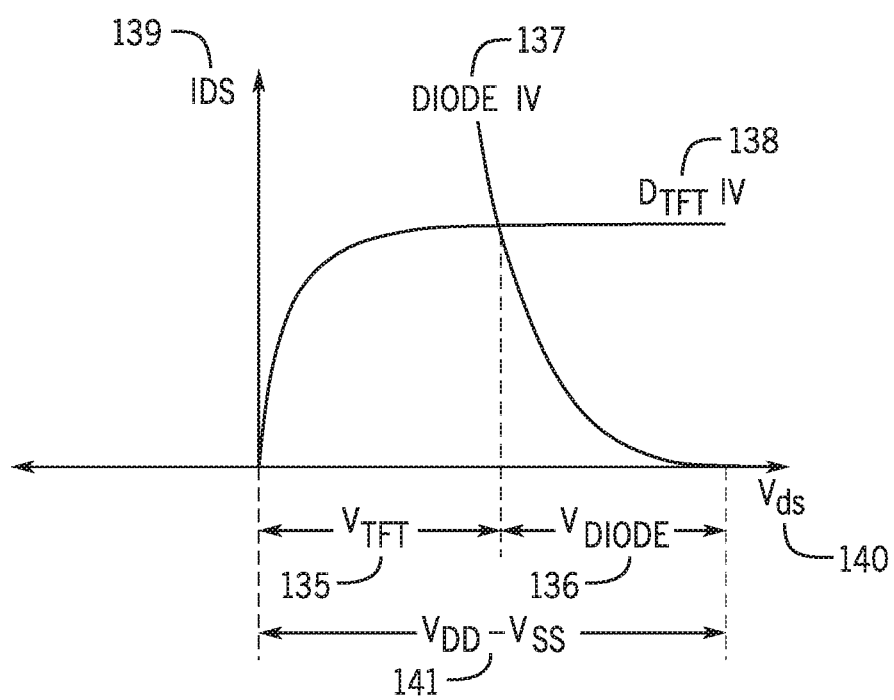
FIG. 11 is a plot of an example driver TFT current-voltage relationship and an example diode current-voltage relationship when the driver TFT of FIG. 10 is in the active or saturation region, according to embodiments of the present disclosure.

In particular, FIG. 11 is a plot of an example driver TFT current-voltage relationship 137 and an example diode current-voltage relationship 138 when the driver TFT 112 is in the active or saturation region, according to embodiments of the present disclosure. The plot illustrates the current 139 between drain and source terminals of the driver TFT 112 in terms of the voltage 140 between the drain and source terminals. As illustrated, the difference 141 between the positive supply voltage $V_{DD}$ 120 and the negative supply voltage $V_{SS}$ 118 is applied in significant portions to both the driver TFT 112 (e.g., $V_{TFT}$ 135) and the diode voltage (e.g., $V_{Diode}$ 136), illustrated here as a 50-50 relationship between $V_{TFT}$ 135 and $V_{Diode}$ 136. That is, $V_{TFT}$ 135 and $V_{Diode}$ 136 are comparable in magnitude. Thus, determining the difference 141 between the positive supply voltage $V_{DD}$ 120 and the negative supply voltage $V_{SS}$ 118 may not provide an accurate estimation of the diode voltage $V_{Diode}$ 136.

Figure 12:
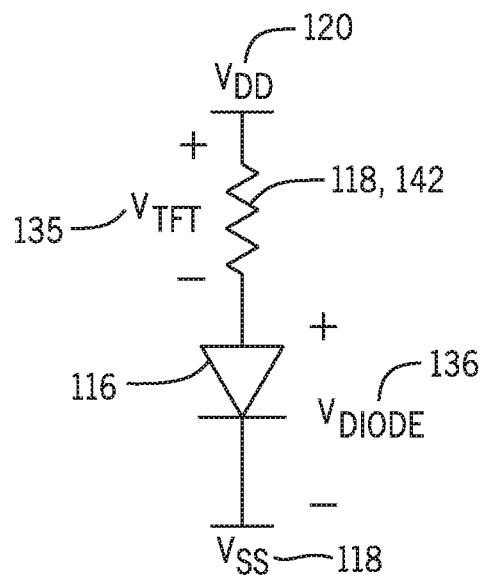
FIG. 12 is a circuit diagram of a portion of the pixel of FIG. 9 with the driver TFT in an ohmic or linear region, according to embodiments of the present disclosure.

However, when the negative supply voltage $V_{SS}$ 118 is increased to place the driver TFT 112 in an ohmic or linear region, the driver TFT 112 may operate as a resistor, reducing or minimizing the driver TFT voltage $V_{TFT}$ 135 when compared to the diode voltage $V_{Diode}$ 136. For example, FIG. 12 is a circuit diagram of a portion of the pixel 64 with the driver TFT 112 in the ohmic or linear region, according to embodiments of the present disclosure. In particular, driver TFT 112 may operate in the ohmic or linear region when $V_{GS}$ 126 is greater than $V_{th}$, and $V_{DS}$ is less than to a difference between $V_{GS}$ 126 and $V_{th}$, as illustrated in the following equations:

$$V_{GS} > V_{th} \quad \text{(Equation 4)}$$

$$V_{DS} < V_{GS} - V_{th} \quad \text{(Equation 5)}$$

As such, the driver TFT 112 acts as a switch that is turned on or closed, and creates a channel is created that enables current to flow between drain and source, but the channel is narrower than the broader two- or three-dimensional current distribution created when the driver TFT 112 is operating in the active or saturation region (e.g., as illustrated in FIG. 10). Thus, the driver TFT 112 may act as a resistor 142, as illustrated in FIG. 10. As a result, the difference between the positive supply voltage $V_{DD}$ 120 and the negative supply voltage $V_{SS}$ 118 may be largely applied to the diode voltage (e.g., $V_{Diode}$ 136), and only negligibly to the driver TFT 112 (e.g., $V_{TFT}$ 135), and thus may provide an accurate estimation of the diode voltage $V_{Diode}$ 136.

Figure 13:
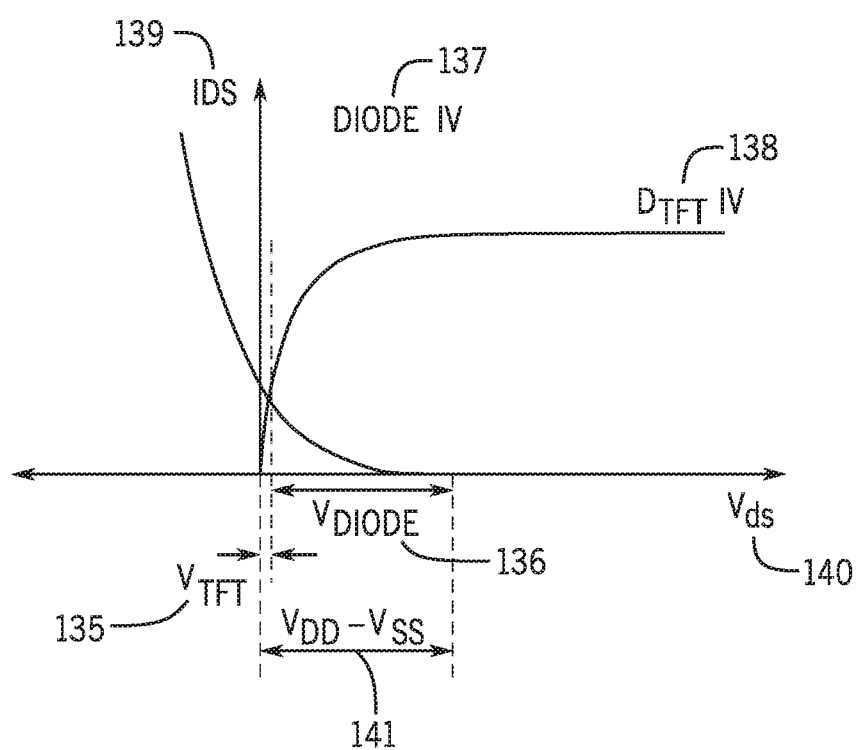
FIG. 13 is a plot of an example driver TFT current-voltage relationship and an example diode current-voltage relationship when the driver TFT of FIG. 12 is in the ohmic or linear region, according to embodiments of the present disclosure.

In particular, FIG. 13 is a plot of an example driver TFT current-voltage relationship 137 and an example diode current-voltage relationship 138 when the driver TFT 112 is in the ohmic or linear region, according to embodiments of the present disclosure. As illustrated, the difference 141 between the positive supply voltage $V_{DD}$ 120 and the negative supply voltage $V_{SS}$ 118 is largely applied to the diode voltage (e.g., $V_{Diode}$ 136), and only negligibly to the driver TFT 112 (e.g., $V_{TFT}$ 135). That is, the difference 141 between the positive supply voltage $V_{DD}$ 120 and the negative supply voltage $V_{SS}$ 118 may be "$V_{Diode}$-dominant" (e.g., when compared to $V_{TFT}$ 135). Indeed, FIG. 13 shows approximately a 95% to 5% relationship between $V_{Diode}$ 136 $V_{TFT}$ 135. As such, determining the difference 141 between the positive supply voltage $V_{DD}$ 120 and the negative supply voltage $V_{SS}$ 118 may an accurate estimation of the diode voltage $V_{Diode}$ 136.

Multiple temperatures may then be applied to the pixel 64, and, for each temperature, the driver-integrated circuit 60 may apply multiple data voltages to the driver TFT 112 to generate multiple target diode currents or luminances, and determine corresponding diode voltages based on the difference between the positive supply voltage $V_{DD}$ 120 and the negative supply voltage $V_{SS}$ 118. The lookup table may be generated based on the temperatures applied, the target diode currents or luminances, and the diode voltages (which represent changes in diode voltage), and represent changes in diode voltage per temperature (e.g., $\Delta V_{Diode}$/Temperature) depending on diode current or luminance (e.g., gray level).

The lookup table may then be used to compensate for operational variations. For example, if compensation is performed internally with respect to the display 18, the driver-integrated circuit 60 may receive a target diode luminance and temperature at the pixel 64 (e.g., as sensed via a temperature sensor of the display 18), and determine a correction voltage by applying the target diode luminance and the temperature to the lookup table. The driver-integrated circuit 60 may then apply a data voltage corresponding to the target diode luminance and the correction voltage to the driver TFT 112 to produce the target diode luminance at the diode 116. If compensation is performed externally with respect to the display 18, the processor core complex 12 may receive a target diode current and temperature at the pixel 64 (e.g., as sensed via a current sensor of the display 18), and determine the correction voltage by applying the target diode current and the temperature to the lookup table. The processor core complex 12 may then instruct the driver-integrated circuit 60 to apply the data voltage corresponding to the target diode current and the correction voltage to the driver TFT 112 to produce the target diode current.

Figure 14:
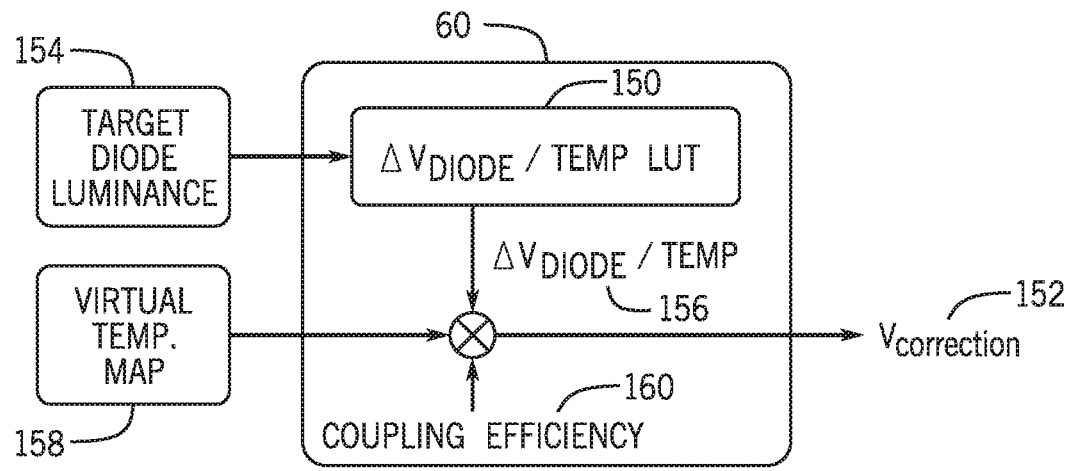
FIG. 14 is a block diagram of a driver-integrated circuit of the display of the electronic device of FIG. 1 using a lookup table that represents changes in diode voltage per temperature depending on diode luminance to determine a correction voltage, according to embodiments of the present disclosure.

With this in mind, FIG. 14 is a block diagram of the driver-integrated circuit 60 of the display 18 of the electronic device 10 of FIG. 1 using a lookup table 150 that represents changes in diode voltage per temperature depending on diode luminance to determine a correction voltage 152, according to embodiments of the present disclosure. As such, FIG. 14 may illustrate the driver-integrated circuit 60 internally (e.g., with respect to the display 18) compensating for operational variations (e.g., temperature variations) at a pixel 64. The lookup table 150 may be generated by increasing the negative supply voltage $V_{SS}$ 118 to place the driver TFT 112 in a linear region, causing the driver TFT 112 to operate as a resistor, thus reducing or minimizing the presence of the driver TFT voltage in comparison to the presence of the diode voltage when taking a difference between the positive supply voltage $V_{DD}$ 120 and the negative supply voltage $V_{SS}$ 118. Multiple temperatures may then be applied to the pixel 64, and, for each temperature, the driver-integrated circuit 60 may apply multiple data voltages to the driver TFT 112 to generate multiple target diode luminances, and determine corresponding diode voltages based on the difference between the positive supply voltage $V_{DD}$ 120 and the negative supply voltage $V_{SS}$ 118. The lookup table may be generated based on the temperatures applied, the target diode luminances, and the diode voltages (which represent changes in diode voltage), and represent changes in diode voltage per temperature (e.g., $\Delta V_{Diode}$/Temperature) depending on diode luminance (e.g., gray level). For example, a relationship or curve (e.g., a linear relationship or curve) may be generated, extrapolated, and/or interpolated based on the temperatures applied, the target diode luminances, and the diode voltages, and the values in the lookup table may be determined using the relationship or curve.

Figure 15:
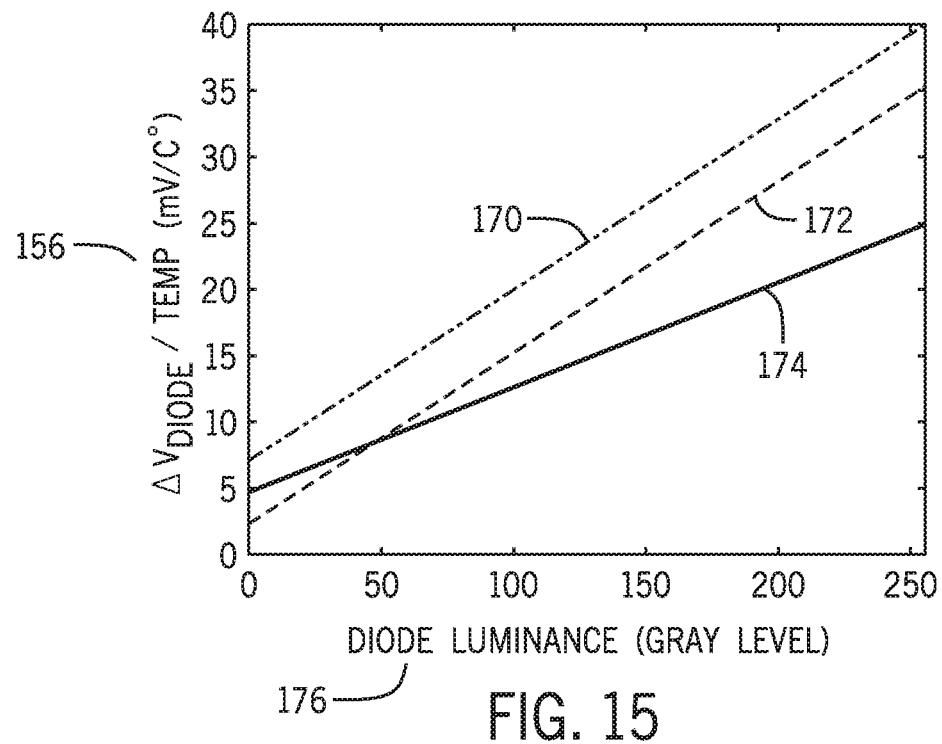
FIG. 15 is a plot of example curves representing changes in diode voltage per temperature depending on diode luminance for which lookup tables may be determined, according to embodiments of the present disclosure.

FIG. 15 is a plot of example curves 170, 172, 174 representing changes in diode voltage per temperature 156 depending on diode luminance 176 for which lookup tables 150 may be determined, according to embodiments of the present disclosure. A pixel 64 may include subpixels (e.g., a red subpixel, a green subpixel, and a blue subpixel), each having a respective diode 116. To have the pixel 64 produce a light of desired luminance and color, the voltage applied to each diode 116 of each subpixel of the pixel 64 may be different. As such, compensation schemes based on sensing (e.g., current) at the driver TFT 112 may fail to compensate for or take into account the separate and possible different voltage losses due to respective parasitic capacitances $C_G$ 132 at diodes 116 of each subpixel of a pixel 64, resulting in undesired luminance and/or color produced by the pixel 64.

FIG. 15 illustrates a separate curve or relationship corresponding to each subpixel, for which a separate lookup table 150 may be determined. The driver-integrated circuit 60 may use each lookup table to compensate for operational variations that are unique or different for each subpixel, due to the different voltage losses caused by at each subpixel. In particular, a first curve 170 represents changes in diode voltage per temperature 156 depending on diode luminance 176 for a red subpixel of the pixel 64, a second curve 172 represents changes in diode voltage per temperature 156 depending on diode luminance 176 for a green subpixel of the pixel 64, and a third curve 174 represents changes in diode voltage per temperature 156 depending on diode luminance 176 for a blue subpixel of the pixel 64. While each curve 170, 172, 174 depicts a linear relationship between the changes in diode voltage per temperature 156 and the diode luminance 176, it should be understood that any suitable relationship is contemplated, such as an exponential relationship, logarithmic relationship, quadratic relationship, random relationship, quasi-random relationship, and so on.

The driver-integrated circuit 60 may then use the lookup tables to compensate for operational variations. In particular, as illustrated in FIG. 14, the driver-integrated circuit 60 may receive a target diode luminance 154, and apply the target diode luminance 154 to the lookup table 150 and determine a diode voltage per temperature (e.g., $\Delta V_{Diode}$/Temperature) 156. In particular, the target diode luminance 154 may be a luminance that is desired to be emitted by the diode 116 such that image data 54 is properly displayed by the pixel 64 (and thus the display 18).

The driver-integrated circuit 60 may also receive a temperature at the pixel 64 via a virtual temperature map 158. The virtual temperature map 158 may store temperature values received from, for example, thermal sensors in the display 18, that correspond to individual pixels 64 or regions (e.g., of pixels 64) of the display 18. As such, the temperature at the pixel 64 may be provided by a temperature value stored in the virtual temperature map 158 that corresponds to the pixel 64 or a region of the display 18 that includes the pixel 64. In additional or alternative embodiments, the temperature may be provided based on receiving current or voltage measurements at or near the pixel 64. The driver-integrated circuit 60 may then multiply the diode voltage per temperature 156 by the temperature to determine the correction voltage 152.

In some embodiments, the driver-integrated circuit 60 may receive or determine a coupling efficiency 160 that represents a relationship (e.g., a proportion) of the parasitic capacitance $C_G$ 132 at the gate of the driver TFT 112 to the storage capacitance $C_{ST}$ of the storage capacitor 114. The coupling efficiency 160 may be determined based on a design layout of the pixel 64. In such embodiments, the driver-integrated circuit 60 may multiply the diode voltage per temperature 156, the temperature, and the coupling efficiency to determine the correction voltage 152.

The driver-integrated circuit 60 may then apply a data voltage corresponding to the target diode luminance and the correction voltage to the driver TFT 112 to produce the target diode luminance at the diode 116.

Figure 16:
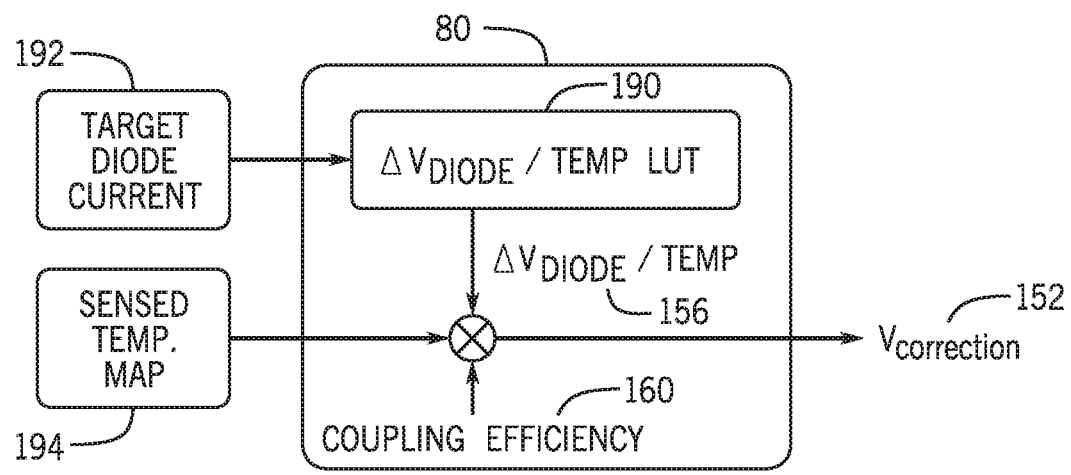
FIG. 16 is a block diagram of image and data generation and processing circuitry using a lookup table that represents changes in diode voltage per temperature depending on diode current to determine a correction voltage, according to embodiments of the present disclosure.

In some cases, compensation for operational variations (e.g., temperature variations) at the pixel 64 may be performed externally (e.g., with respect to the display 18), such as by the processor core complex 12. FIG. 16 is a block diagram of the image and data generation and processing circuitry 80 of the electronic device 10 of FIG. 1 using a lookup table 190 that represents changes in diode voltage per temperature depending on diode current to determine a correction voltage 152, according to embodiments of the present disclosure. The lookup table 190 may be generated by increasing the negative supply voltage $V_{SS}$ 118 to place the driver TFT 112 in a linear region, causing the driver TFT 112 to operate as a resistor, thus reducing or minimizing the presence of the driver TFT voltage in comparison to the presence of the diode voltage when taking a difference between the positive supply voltage $V_{DD}$ 120 and the negative supply voltage $V_{SS}$ 118. Multiple temperatures may then be applied to the pixel 64, and, for each temperature, the processor core complex 12 may instruct the driver-integrated circuit 60 to apply multiple data voltages to the driver TFT 112 to generate multiple target diode currents, and determine corresponding diode voltages based on the difference between the positive supply voltage $V_{DD}$ 120 and the negative supply voltage $V_{SS}$ 118. The lookup table may be generated based on the temperatures applied, the target diode currents, and the diode voltages (which represent changes in diode voltage), and represent changes in diode voltage per temperature (e.g., $\Delta V_{Diode}$/Temperature) depending on diode current. For example, a relationship or curve (e.g., an exponential relationship or curve) may be generated, extrapolated, and/or interpolated based on the temperatures applied, the target diode currents, and the diode voltages, and the values in the lookup table may be determined using the relationship or curve.

Figure 17:
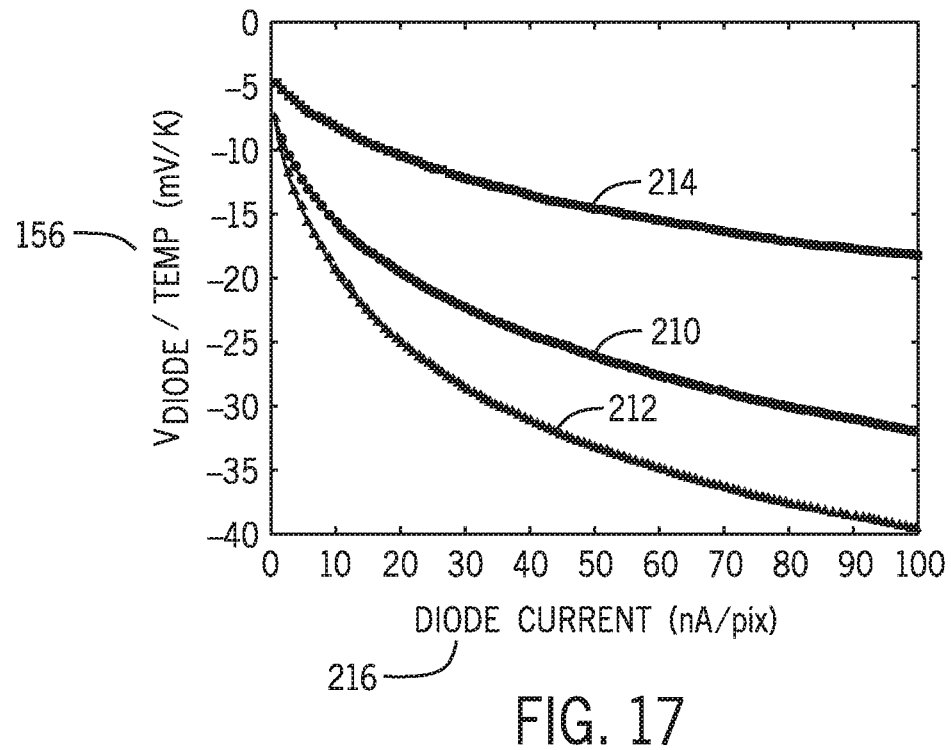
FIG. 17 is a plot of example curves representing changes in diode voltage per temperature depending on diode current for which lookup tables may be determined, according to embodiments of the present disclosure.

FIG. 17 is a plot of example curves 210, 212, 214 representing changes in diode voltage per temperature 156 depending on diode current 216 for which lookup tables 190 may be determined, according to embodiments of the present disclosure. Each separate curve or relationship 210, 212, 214 corresponds to a respective subpixel of the pixel 64, and a separate lookup table 190 may be determined for each curve 210, 212, 214. The processor core complex 12 may use each lookup table to compensate for operational variations that are unique or different for each subpixel, due to the different voltage losses caused by at each subpixel. In particular, a first curve 210 represents changes in diode voltage per temperature 156 depending on diode current 216 for a red subpixel of the pixel 64, a second curve 212 represents changes in diode voltage per temperature 156 depending on diode current 216 for a green subpixel of the pixel 64, and a third curve 214 represents changes in diode voltage per temperature 156 depending on diode current 216 for a blue subpixel of the pixel 64. While each curve 210, 212, 214 depicts an exponential relationship between the changes in diode voltage per temperature 156 and the diode current 216, it should be understood that any suitable relationship is contemplated, such as a linear relationship, logarithmic relationship, quadratic relationship, random relationship, quasi-random relationship, and so on.

The processor core complex 12 may then use the lookup tables to compensate for operational variations. In particular, as illustrated in FIG. 16, the processor core complex 12 may receive a target diode current 192, and apply the target diode current 192 to the lookup table 190 and determine a diode voltage per temperature (e.g., $\Delta V_{Diode}$/Temperature) 156. In particular, the target diode current 192 may be a current that is desired to be supplied to the diode 116 that causes the diode 116 to emit a luminance such that image data 54 is properly displayed by the pixel 64 (and thus the display 18).

The processor core complex 12 may also receive a temperature at the pixel 64 via a sensed temperature map 194. The sensed temperature map 194 may store temperature values received or derived from, for example, current or voltage values determined via current or voltage sensors in the display 18. The temperature values may correspond to individual pixels 64 or regions (e.g., of pixels 64) of the display 18. As such, the temperature at the pixel 64 may be provided by a temperature value stored in the sensed temperature map 194 that corresponds to the pixel 64 or a region of the display 18 that includes the pixel 64. In additional or alternative embodiments, the temperature may be provided based on receiving temperature measurements at or near the pixel 64. The processor core complex 12 may then multiply the diode voltage per temperature 156 by the temperature to determine the correction voltage 152.

In some embodiments, the processor core complex 12 may receive or determine a coupling efficiency 160 that represents a relationship or proportion of the parasitic capacitance $C_G$ 132 at the gate of the driver TFT 112 to the storage capacitance $C_{ST}$ of the storage capacitor 114. The coupling efficiency 160 may be determined based on a design layout of the pixel 64. In such embodiments, the processor core complex 12 may multiply the diode voltage per temperature 156, the temperature, and the coupling efficiency to determine the correction voltage 152.

The processor core complex 12 may then instruct the driver-integrated circuit 60 to apply a data voltage corresponding to the target diode current and the correction voltage to the driver TFT 112 to produce the target diode current at the diode 116.

Figure 18:
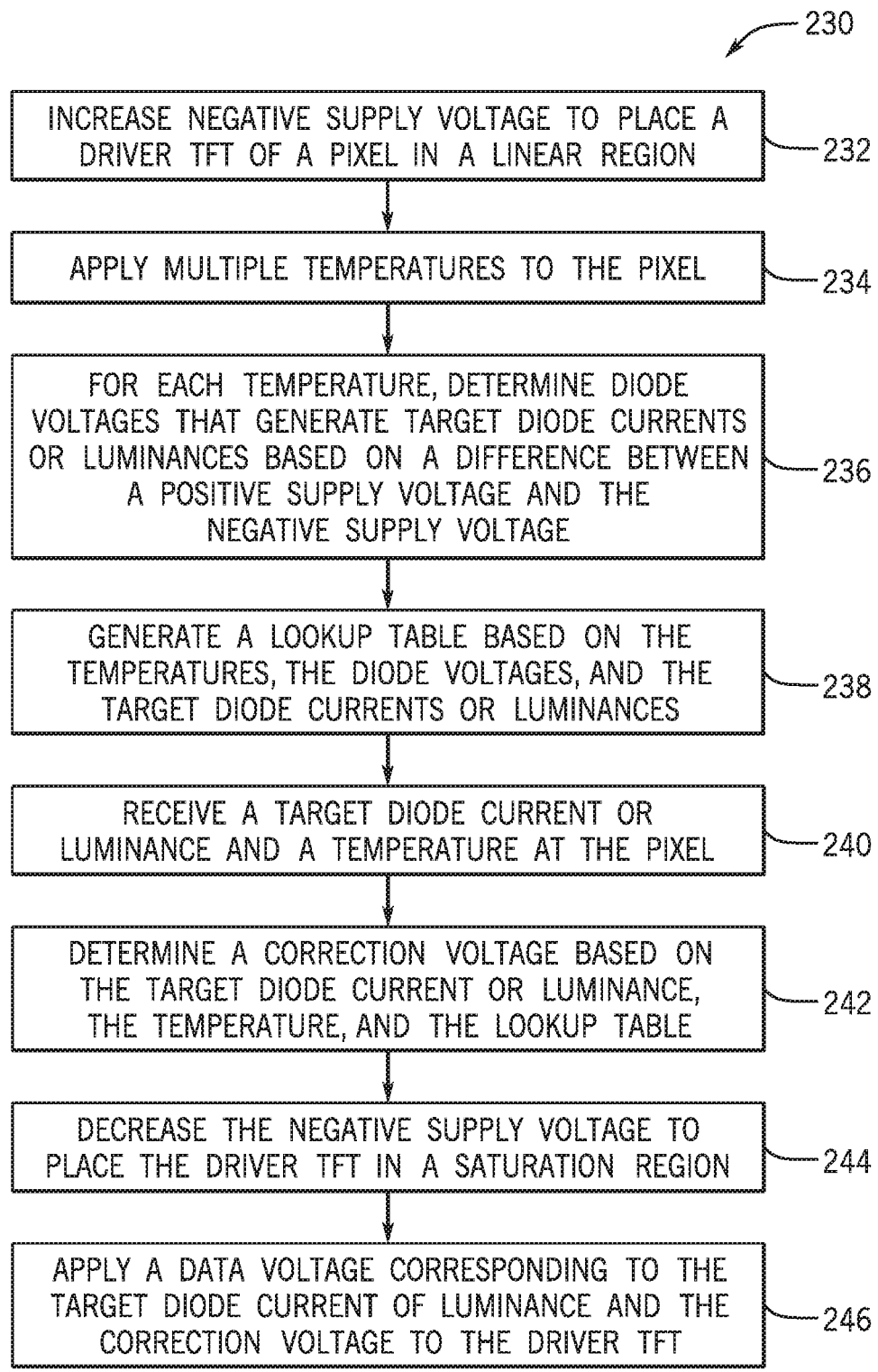
FIG. 18 is process for compensating for temperature-based parasitic capacitance variation in the display of the electronic device of FIG. 1, according to embodiments of the present disclosure.

With this in mind, FIG. 18 is process 230 for compensating for temperature-based parasitic capacitance variation in the display 18 of the electronic device 10 of FIG. 1, according to embodiments of the present disclosure. The process 230 may be repeated for multiple pixels 64 (and subpixels of the pixels 64) to determine multiple target voltages to be applied at respective driver TFTs 112 of the multiple pixels 64 (and subpixels) to compensate for temperature-based parasitic capacitance variation at each of the multiple pixels 64 (and subpixels). While the process 230 is described using steps in a specific sequence, it should be understood that the present disclosure contemplates that the describe steps may be performed in different sequences than the sequence illustrated, and certain described steps may be skipped or not performed altogether.

In some embodiments, such as when compensation is performed externally (with respect to the display 18), the process 230 may be implemented by executing instructions stored in a tangible, non-transitory, computer-readable medium, such as the local memory 14 and/or the main memory storage device 16, using a processor, such as the processor core complex 12, and, in particular, the image correction circuitry 52 and/or the aging/temperature determination circuitry 56 of the processor core complex 12 shown in FIG. 7. In alternative or additional embodiments, such as when compensation is performed internally (with respect to the display 18), the process 230 may be performed by the driver-integrated circuit 60 and/or implemented by the processor core complex 12 causing or instructing components of the display 18, such as the driver-integrated circuit 60, to carry out instructions.

As illustrated, in process block 232, the driver-integrated circuit 60 increases the negative power supply voltage $V_{SS}$ 118 to place the driver TFT 188 of a pixel 64 in the ohmic or linear region. As a result, the driver TFT 188 may act as a resistor 142 (e.g., as shown in the circuit diagram of FIG. 12), and the difference 141 between the positive supply voltage $V_{DD}$ 120 and the negative supply voltage $V_{SS}$ 118 may be $V_{Diode}$-dominant (e.g., as shown in the plot of FIG. 13). This way, taking the difference between the positive supply voltage $V_{DD}$ 120 and the negative supply voltage $V_{SS}$ 118 may provide an accurate estimation of the diode voltage $V_{Diode}$ 136.

In process block 234, multiple temperatures are applied to the pixel 64. In particular, any suitable temperatures may be applied to generate an accurate relationship or curve between changes in diode voltage per temperature and diode luminance or current (as shown in the example curves 170, 172, 174, 210, 212, 214 in the plots of FIGS. 15 and 17). For example, at the manufacturing facility or assembly plant at which the display 18 is made or assembled, multiple different temperatures may be applied to the display 18 and/or pixel 64.

In process block 236, for each temperature applied to the pixel 64, the driver-integrated circuit 60 determines a diode voltages $V_{Diode}$ 136 that generate target diode currents or luminances based on the difference between the positive supply voltage $V_{DD}$ 120 and the negative supply voltage $V_{SS}$ 118. That is, for a target diode current or luminance, and for an applied temperature, the driver-integrated circuit 60 determines the diode voltage $V_{Diode}$ 136 that generates the diode current or luminance at the diode 116.

In process block 238, the driver-integrated circuit 60 generates a lookup table based on the temperatures, the diode voltages, and the target diode currents or luminances. For example, for cases where the compensation is performed internally, the driver-integrated circuit 60 may generate the lookup table 150 (e.g., as illustrated in FIG. 14) to express change in diode voltage per temperature varying by diode luminance. As such, the lookup table 150 may be based on generated, interpolated, and/or extrapolated curves or relationships that associate change in diode voltage per temperature to diode luminance, such as those illustrated in the plot of FIG. 15. For cases where the compensation is performed externally, the processor core complex 12 may generate the lookup table 190 (e.g., as illustrated in FIG. 16) to express change in diode voltage per temperature varying by diode current. As such, the lookup table 190 may be based on generated, interpolated, and/or extrapolated curves or relationships that associate change in diode voltage per temperature to diode current, such as those illustrated in the plot of FIG. 17.

In process block 240, the driver-integrated circuit 60 receives a target diode current or luminance and a temperature at the pixel 64. The target diode luminance 154 may be a luminance that is desired to be emitted by the diode 116 such that image data 54 is properly displayed by the pixel 64 (and thus the display 18). As such, for cases where the compensation is performed internally, as shown in FIG. 14, the driver-integrated circuit 60 may receive the target diode luminance 154, and receive a temperature at the pixel 64 via a virtual temperature map 158. The virtual temperature map 158 may store temperature values received from, for example, thermal sensors in the display 18, that correspond to individual pixels 64 or regions (e.g., of pixels 64) of the display 18.

Similarly, the target diode current 192 may be a current that is desired to be supplied to the diode 116 that causes the diode 116 to emit a luminance such that image data 54 is properly displayed by the pixel 64 (and thus the display 18). As such, for cases where the compensation is performed externally, as shown in FIG. 16, the processor core complex 12 may receive the target diode current 192, and receive a temperature at the pixel 64 via a sensed temperature map 194. The sensed temperature map 194 may store temperature values received or derived from, for example, current or voltage values determined via current or voltage sensors in the display 18.

In process block 242, the driver-integrated circuit 60 determines a correction voltage based on the target diode current or luminance, the temperature, and the lookup table. For example, as shown in FIGS. 14 and 16, the driver-integrated circuit 60 may multiply the diode voltage per temperature 156 by the temperature to determine the correction voltage 152. In some embodiments, the driver-integrated circuit 60 may receive or determine a coupling efficiency 160 that represents a relationship or proportion of the parasitic capacitance $C_G$ 132 at the gate of the driver TFT 112 to the storage capacitance $C_{ST}$ of the storage capacitor 114. As such, the driver-integrated circuit 60 may multiply the diode voltage per temperature 156, the temperature, and the coupling efficiency to determine the correction voltage 152.

In process block 244, the driver-integrated circuit 60 decreases the negative supply voltage $V_{SS}$ 118 to place the driver TFT 188 of a pixel 64 in the active or saturation region. As a result, the driver TFT 188 may act as a current source 134 (e.g., as shown in the circuit diagram of FIG. 10), and be operated to control magnitude of supply current flowing through the diode 116 to cause the diode 116 to emit light at a desired or target luminance.

In process block 246, the driver-integrated circuit 60 applies the data voltage corresponding to the target diode current or luminance and the correction voltage to the driver TFT 112. In particular, the data voltage may be predetermined (e.g., at an initial time and/or temperature, such as at the manufacturing facility or assembly plant at which the display 18 is made or assembled) as a voltage that causes the target diode current or luminance at the diode 116. In some embodiments, the data voltage may be stored in a lookup table with other data voltages that cause other target diode current or luminance at the diode 116. For example, FIGS. 14 and 16 illustrate the correction voltage 152 output from the driver-integrated circuit 60 or the image data generation and processing circuitry 80, respectively. In this manner, the process 230 may compensate for temperature-based parasitic capacitance variation in the display 18.

Figure 19:
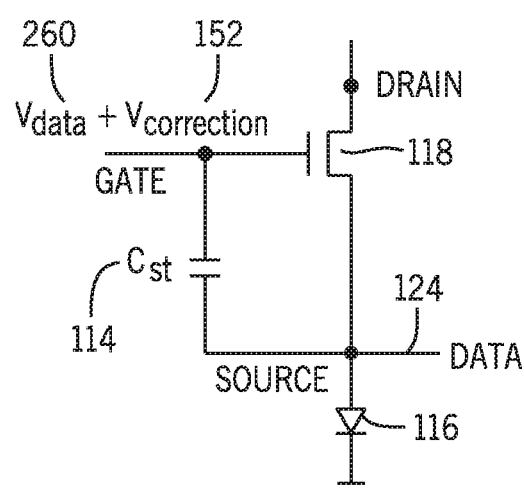
FIG. 19 is a circuit diagram of a portion of the pixel of FIG. 9 with a correction voltage being applied, according to embodiments of the present disclosure.

As an illustrative example, FIG. 19 is a circuit diagram of a portion of the pixel 64 with the correction voltage 152 being applied, according to embodiments of the present disclosure. That is, to properly display image data 54 on the display 18, the driver-integrated circuit 60 may apply both the data voltage $V_{data}$ 260 and the correction voltage 152 to the gate of the driver TFT 112 of the pixel 64. The data voltage $V_{data}$ 260 may be the predetermined voltage that causes the target diode current or luminance at the diode 116. Because temperature-based parasitic capacitance variation at the gate of the driver TFT 112 may cause a loss of data voltage during emission, the correction voltage 152 may be applied (e.g., added to) the data voltage $V_{data}$ 260 to compensate for the loss of data voltage, thus causing the target diode current to be supplied or the target diode luminance to be emitted at the diode 116.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A mobile electronic device comprising:
a display comprising a pixel, wherein the pixel comprises:
   a diode configured to emit a luminance based at least on a current through the diode; and
   a transistor configured to control the current flowing through the diode based at least on a voltage received; and
processing circuitry separate from but communicatively coupled to the display, wherein the processing circuitry is configured to:
   cause the display to operate the transistor to enter a linear region;
   determine a plurality of diode voltages that generate a plurality of target diode currents of the diode at a plurality of temperatures at the pixel based at least on a difference between a positive supply voltage and a negative supply voltage supplied to the pixel;
   generate a lookup table based at least on the plurality of temperatures, the plurality of diode voltages, and the plurality of target diode currents;
   receive a target diode current and a temperature at the pixel;
   apply the target diode current to the lookup table to determine a diode voltage per temperature;
   determine a product of at least the diode voltage per temperature and the temperature at the pixel;

determine a correction voltage based on the product of at least the diode voltage per temperature and the temperature at the pixel; and apply a data voltage corresponding to the target diode current and the correction voltage to the transistor.

2. The mobile electronic device of claim 1, wherein the processing circuitry is configured to cause the display to operate the transistor to enter the linear region by at least increasing the negative supply voltage.

3. The mobile electronic device of claim 2, wherein the negative supply voltage is increased such that a first voltage across a drain terminal and a source terminal of the transistor is less than a difference between a second voltage across a gate terminal and the source terminal of the transistor and a threshold voltage of the transistor.

4. The mobile electronic device of claim 2, wherein the processing circuitry is configured to set the negative supply voltage such that a first voltage across a drain terminal and a source terminal of the transistor is greater than or equal to a difference between a second voltage across a gate terminal and the source terminal of the transistor and a threshold voltage of the transistor prior to applying the data voltage.

5. The mobile electronic device of claim 1, wherein the lookup table represents changes in diode voltage per temperature depending on diode current.

6. The mobile electronic device of claim 1, wherein the processing circuitry is configured to determine the correction voltage based on a coupling efficiency and the product of at least the diode voltage per temperature and the temperature at the pixel.

7. The mobile electronic device of claim 6, wherein the coupling efficiency represents a relationship of a parasitic capacitance at a gate terminal of the transistor to a storage capacitance of a storage capacitor of the pixel.

8. The mobile electronic device of claim 6, wherein the processing circuitry is configured to determine the correction voltage based on an additional product of the coupling efficiency and the product of at least the diode voltage per temperature and the temperature at the pixel.

9. A method for compensating for temperature-based parasitic capacitance variation of a pixel of a display, wherein the method comprises:

causing a transistor of the pixel to enter a linear region;

generating a lookup table based at least on a plurality of temperatures at the pixel, a plurality of diode voltages, and a plurality of target diode currents or a plurality of target luminances at a diode of the pixel;

applying a target diode current or a target luminance to the lookup table to determine a diode voltage per temperature;

determining a product of at least the diode voltage per temperature and a temperature at the pixel;

determining a correction voltage based on the product of at least the diode voltage per temperature and the temperature at the pixel; and applying a data voltage corresponding to the target diode current or the target luminance and the correction voltage to the transistor.

10. The method of claim 9, wherein the plurality of diode voltages are configured to generate the plurality of target diode currents or the plurality of target luminances of the diode at the plurality of temperatures.

11. The method of claim 9, comprising determining each diode voltage of the plurality of diode voltages by at least determining a difference between a positive supply voltage and a negative supply voltage supplied to the pixel.

12. The method of claim 11, wherein each diode voltage is determined while the transistor is in the linear region.

13. The method of claim 9, comprising causing the transistor to enter a saturation region.

14. The method of claim 13, wherein the data voltage is applied while the transistor is in the saturation region.

15. A display comprising:

a pixel comprising:
a diode configured to emit a luminance based at least on a current through the diode; and
a transistor configured to control the current flowing through the diode based at least on a voltage received; and a driver-integrated circuit configured to:
cause the transistor to enter a linear region;
generate a lookup table based at least on a plurality of temperatures at the pixel, a plurality of diode voltages, and a plurality of target luminances at the diode;
apply a target luminance at the diode to the lookup table to determine a diode voltage per temperature;
determine a product of at least the diode voltage per temperature and a temperature at the pixel;
determine a correction voltage based on the product of at least the diode voltage per temperature and the temperature at the pixel;
cause the transistor to enter a saturation region; and
apply a data voltage corresponding to the target luminance and the correction voltage to the transistor.

16. The display of claim 15, wherein entering the linear region causes the transistor to act as a resistor.

17. The display of claim 15, wherein entering the saturation region causes the transistor to act as a current source.

18. The display of claim 15, wherein the plurality of diode voltages are configured to generate the plurality of target luminances of the diode at the plurality of temperatures.

19. The display of claim 15, wherein the driver-integrated circuit is configured to determine each diode voltage of the plurality of diode voltages by at least determining a difference between a positive supply voltage and a negative supply voltage supplied to the pixel.

20. The display of claim 15, wherein each diode voltage is determined while the transistor is in the linear region.

* * * * *